United States Patent

[11] 3,621,101

| [72] | Inventors | Povl V. Petersen<br>Virum;<br>Villy H. Hansen, Copenhagen; Jes<br>Hjortkjaer, Hvidovre, all of Denmark |
|---|---|---|
| [21] | Appl. No. | |
| [22] | Filed | Jan. 14, 1970 |
| [45] | Patented | Nov. 16, 1971 |
| [73] | Assignee | Kefalas AIS<br>Copenhagen-Valby, Denmark |
| [32] | Priority | Oct. 10, 1965 |
| [33] | | Great Britain |
| [31] | | 41,849/65 |
| | | Continuation-in-part of application Ser. No. 580,206, Sept. 19, 1966, now Patent No. 3,505,404. This application Jan. 14, 1970, Ser. No. 002,928 |

[54] ANTIDEPRESSANT COMPOSITION AND METHOD OF TREATING DEPRESSION
16 Claims, No Drawings

[52] U.S. Cl.................................................... 424/330

[51] Int. Cl.................................................... A61k 27/00
[50] Field of Search...................................... 424/330

[56] References Cited
UNITED STATES PATENTS

| 2,798,888 | 7/1957 | Verberwasser.............. | 260/570.8 |
| 3,408,389 | 10/1968 | Bernstein et al............. | 260/570.8 X |

*Primary Examiner*—Stanley J. Friedman
*Attorneys*—Gordon W. Hueschen and Talivaldis Cepuritis

ABSTRACT: 1-(Aminoalkyl)-1-phenylindanes and 1-(aminoalkyl)-1-phenyl-tetralines, and the corresponding acid addition salts thereof are prepared by reacting the corresponding 1-phenylindane or 1-phenyl-tetraline with an amino alkyl halide. The prepared compounds are useful for the treatment of endogenous depression in living animals and are administered as compositions comprising the active ingredient and a suitable pharmaceutical carrier.

ANTIDEPRESSANT COMPOSITION AND METHOD OF TREATING DEPRESSION

CROSS-REFERENCE TO RELATED APPLICATIONS

This application is a continuation-in-part of U.S. Ser. No. 580,206 filed on 19 Sept., 1966 now U.S. Pat. No. 3,505,404.

SUMMARY OF THE INVENTION

The present invention relates to compositions containing compounds of the following general formula:

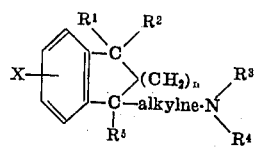
    I wherein $R^1$ and $R^2$ each represents hydrogen or a lower-alkyl group, $n$ is 1 or 2, "alkylene" represents alkylene chain branched or unbranched containing from two to eight carbon atoms at least two and at the highest four carbon atoms being in the chain directly connecting the ring system with the nitrogen atom, $R^3$ and $R^4$ each represents hydrogen, or a lower-alkyl group, provided that $R^3$ and $R^4$ may not both represent hydrogen, $R^5$ represents a phenyl group, possibly substituted with a chlorine or fluorine atom, a lower-alkyl group, a lower-alkyloxy group or a trifluoromethyl group, and X represents hydrogen, chlorine, fluorine, a lower-alkyl group, a lower-alkyloxy group or a trifluoromethyl group, as well as pharmaceutically acceptable acid addition salts thereof.

It is an object of the present invention to provide compounds of formula I, methods of making the same, a method for the alleviation, palliation, mitigation, or inhibition of the manifestations of certain physiological-psychological abnormalities of animals therewith, and pharmaceutical compositions comprising such compounds as active ingredient. Other objects will be apparent to one skilled in the art and still other objects will become apparent hereinafter.

According to the present invention it has been found that the compounds contained in the claimed compositions show excellent pharmacodynamic properties which make them useful in psychotherapy, especially in the treatment of endogenous depressions.

In animal experiments the compounds of formula I and the acid addition salts thereof show a very pronounced potentiating effect or adrenaline and nor-adrenaline and also a very strong antireserpine effect. They moreover have relatively weak sedative and anticholinergic effects. The acute toxicity is relatively low. The foregoing pharmacodynamic properties constitute a characteristic pharmacologic profile of antidepressants of the thymoleptic type.

The compounds of formula I wherein $R^1$ and $R^2$ both represent lower-alkyl groups show particularly outstanding pharmacodynamic properties in the aforesaid animal experiments which make them particularly suitable for use in psychotherapy.

The compounds of formula I and the pharmaceutically acceptable acid addition salts thereof may be administered both orally and parenterally, for example in the form of tablets, capsules, powders, syrups or solutions for injection.

DESCRIPTION OF THE PREFERRED EMBODIMENTS

Compounds of formula I are prepared by reacting a compound of the formula:

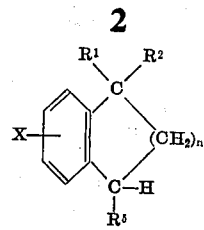
    II wherein $R^1$, $R^2$, $n$ and X are as defined above, and $R^5$ represents a phenyl group, possibly substituted with a chlorine or fluorine atom, a lower-alkyl group, a lower-alkyloxy group or a trifluoromethyl group with a compound of the formula:

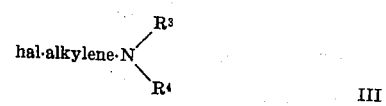
    III wherein "alkylene," $R^3$ and $R^4$ are as defined above and "hal" represents a halogen atom, in the presence of an alkalimetal hydride or potassium amide in dimethylsulphoxide or liquid ammonia, and isolating the compound of formula I as the free amine or as a nontoxic acid addition salt in conventional manner, and in the case when $R^3$ and $R^4$ each represents a lower-alkyl group, if desired, reacting the compound of formula I with a chloroformic acid ester of the formula Cl·COOR⁶, wherein $R^6$ represents a lower-alkyl group or a benzyl group, hydrolyzing the resulting compound of the formula:

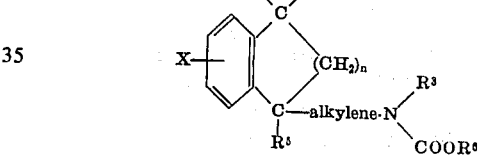

and isolating the compound of formula I, wherein $R^3$ is a lower-alkyl group and $R^4$ is hydrogen as the free amine or in the form of a nontoxic addition salt.

When using an alkalimetal hydride as a condensing agent sodium hydride is preferably used and the temperature of the reaction is advantageously kept within about room temperature and about 200° C.

The reaction taking place in the presence of an alkali-metal hydride as a condensing agent is preferably carried out in dimethyl-sulfoxide as an inert solvent. In the case where potassium amide is used as the condensing agent it is sometimes convenient to carry out the reaction in liquid ammonia. Also mixtures of these solvents may be used.

The acid addition salts of the novel compounds of formula I are preferably salts of pharmacologically acceptable acids such as mineral acids, for example, hydrochloric acid, hydrobromic acid, phosphoric acid, sulphuric acid, and the like, and organic acids such as acetic acid, tartaric acid, maleic acid, citric acid, methane sulphonic acid, and the like.

In the foregoing formula I and elsewhere herein, the terms lower-alkyl and lower-alkyloxy refer to alkyl or alkyloxy radicals containing up to and including eight carbon atoms, and preferably no more than three carbon atoms, which radicals may have either straight or branched-chain structure, for example methyl, ethyl, propyl, isopropyl, butyl, isobutyl, amyl, hexyl, heptyl, octyl, methoxy, ethoxy, propoxy, butoxy, amyloxy, hexoxy, heptoxy, or the like.

The starting compounds of formula II are preferably such compounds wherein X is hydrogen, $R^1$ and $R^2$ are most preferably methyl groups, $n$ is 1, and $R^5$ is a phenyl group, and the amino-alkylhalides of formula III are advantageously such compounds wherein $R^3$ and $R^4$ are hydrogen or methyl groups, and "alkylene" is a propylene chain not only from the standpoint of pharmacological importance and availability of these starting materials, but also from the standpoint of ease of operation and smoothness of reaction.

The following examples are given by way of illustration only and are not to be construed as limiting.

Example 1    1-(3'-dimethylaminopropyl)-1-phenylindane and its hydrochloride.

20 grams of a sodiumhydride/mineral oil-suspension (50 percent sodium hydride by weight) were suspended in 250 milliliters of dimethylsulphoxide with stirring at room temperature consecutively, 65 grams of 1-phenylindane and 50 grams of freshly distilled 3-dimethylaminopropylchloride were added and the mixture was heated cautiously on a steambath in nitrogen-atmosphere until the temperature reached about 60°–70 C. when a vigorous exothermic reaction started. The temperature of the mixture rose to about 150° C. After the spontaneous reaction had subsided, heating was continued under reflux for a further hour with stirring. The excess of sodium hydride was removed by addition of the hydrochloride of dimethylaminopropylchloride until the red color of the mixture was replaced by a yellow to green color. Thereupon were added a few milliliters of methanol and 1 liter of water. The mixture was extracted with ether and the ether phase isolated, whereupon the ether phase was extracted with 4 n hydrochloric acid. The hydrochloride of 1-(3'-dimethylamino-propyl)-1-phenylindane crystallized in the aqueous phase and was filtered off. After drying in vacuo-desiccator and recrystallization from a mixture of ethanol-ether it melted at 165°–167° C. Yield 50 grams.

Example 2    14 grams of the hydrochloride of 1-(3'-dimethylamino-propyl)-1-phenylindane were converted to the free base by dissolving in water, adding sodium hydroxide and extracting the liberated base with benzene and drying the benzene solution over anhydrous potassium carbonate. Thereupon 20 grams of dry ethylchloroformiate were added and the mixture was kept at 40° C. for 1 hour. The benzene-solution was thereupon extracted with water, dilute hydrochloric acid and sodium hydrogen carbonate solution, dried and evaporated. The residue was saponified with a mixture of 7 grams of potassium hydroxide, 7 milliliters of water and 50 milliliters of diethylene-glycol-mono-ethyl-ether under reflux for 20 hours. The reaction mixture was then diluted with water and the base extracted with ether. By addition of dilute hydrochloric acid to the ether phase the hydrochloride of 1-(3-methylaminopropyl)-1-phenyl-indane was obtained as colorless crystals which after drying and recrystallization from acetone melted at 177°–180° C. Yield 5 grams.

Example 3    3,3-dimethyl-1-(3'-dimethylaminopropyl)-1-phenyl-indane and its hydrochloride.

The starting 3,3-dimethyl-1-phenyl-indane was obtained as follows:

Forty-six grams of 4.4-diphenyl-2-methyl-butanol-2 were added to 400 milliliters of concentrated sulphuric acid while stirring at room temperature. The reaction mixture was kept at about 30° C. for 30 minutes whereupon it was poured onto finely crushed ice and extracted with ether. The ether phase was neutralized with sodium-hydrogencarbonate-solution, dried, treated with active carbon and filtered. The ether was evaporated and the residue crystallized from methanol yielding 3.3-dimethyl-1-phenyl-indane as colorless crystals melting at 41°–45° C. Yield 31 grams.

11 grams of 3.3-dimethyl-1-phenyl-indane, 12 grams of 3-dimethylaminopropylchloride and 12 grams of sodium-hydride/mineral oil-suspension 50/50 were heated with 50 milliliters of dimethylsulfoxide to about 70° C. when an exothermic reaction began. The further course of the reaction was as in example 1 and the working up of the reaction mixture was similar. There was obtained 11 grams of the hydrochloride of 3.3-dimethyl-1-(3'-dimethylaminopropyl)-1-phenyl-indane melting at 205°–208° C.

Example 4    3.3-dimethyl-1-(3'-methylaminopropyl)-1-phenyl-indane and its hydrochloride.

When example 2 was carried out using 11 grams of 3.3-dimethyl-1-(3'-dimethylaminopropyl)-1-phenyl-indane instead of 1-(3'-dimethylaminopropyl)-1-phenyl-indane the hydrochloride of 3.3-dimethyl-1-(3'-methylaminopropyl)-1-phenyl-indane was obtained as a crystalline substance melting at 150°–155° C. after recrystallization from acetone.

Example 5    1-(3'-dimethylaminopropyl)-1-phenyl-tetraline and its hydrochloride.

25 grams of 1-phenyl-tetraline were added to a mixture of potassium amide, prepared from 5 grams of potassium and 0.25 grams of ferrinitrate, and 325 milliliters of liquid ammonia, while stirring and the stirring continued for further 30 minutes, whereupon 18 grams of freshly distilled 3-dimethylaminopropylchloride were added dropwise. The red color of potassium-phenyltetraline disappeared gradually and the stirring was continued until all ammonia had evaporated. Dilute hydrochloric acid was then added and the mixture extracted with ether. The aqueous phase was separated off and made alkaline whereupon the separated oil was taken over in ether. The ether phase was washed with water, dried over anhydrous potassium carbonate and evaporated. The residue was dissolved in acetone and the hydrochloride of 1-(3'-dimethylaminopropyl)-1-phenyl-tetraline precipitated by addition of hydrogen chloride in acetone. After recrystallization from acetone it melted at 207°–209° C. Yield 10 grams.

Example 6    3-methyl-1-(3'-dimethylaminoproply)-1-phenyl-indane and its isomers as well as hydrochlorides thereof 10 grams of 1-phenyl-3-methyl-indane, prepared in well-known manner by dimerization of styrene with strong sulphuric acid, were reacted as described in example 1 with 3 grams of sodiumhydride and 7.5 grams of 3-dimethylaminopropylchloride in 40 milliliters of dimethylsulphoxide in an atmosphere of nitrogen. The exothermic reaction began first at about 80°–90° C. The further isolation and working up of the reaction mixture was carried out as described in example 1 except that the mixture of the isomeric hydrochlorides was precipitated from ethanol-ether (1:1) and recrystallized from methyl-iso-butylketone, whereby the hydrochloride of an isomer, for convenience named the α-form, was obtained as white crystals melting at 160°–162° C.

Example 7    3-methyl-1-(3'-methylaminopropyl)-1-phenyl-indane and its isomers as well as hydrochlorides thereof.

When example 2was carried out using the hydrochloride of 3-methyl-1-(3+-dimethylaminoproply)-1-phenyl-indane instead of 1-(3'-dimethylaminopropyl)-1-phenyl-indane a mixture of the hydrochlorides of 3-methyl-1-(3'-methylaminopropyl)-1-phenyl-indane was obtained melting at about 150° C. Repeated recrystallizations from a mixture of acetone and ethanol (1:1 gave the two isomeric hydrochlorides with the following melting points:

α:    M.P.    186°–198° C.
β:    M.P.    165°–166° C.

Example 8    3-methyl-1-(2'-dimethylaminoethyl)-1-phenyl-indane, its isomers and their hydrochlorides.

When example 6 was carried out using 2-dimethyl-aminoethylchloride instead of 3-dimethylaminopropylchloride a mixture of the isomeric hydrochlorides of 3-methyl-1-(2'-dimethylaminoethyl)-1-phenyl-indane was obtained. Repeated recrystallizations from acetone gave the two isomeric hydrochlorides with the following melting points:

α-form:    M.P.    218°–220° C.
β-form:    M.P.    206–207° C.

Example 9    3-methyl-1-(2'-methylaminoethyl)-1-phenyl-indane, its isomers and their hydrochlorides.

When example 2 was carried out using the hydrochloride of 3-methyl-1-(2'-dimethylaminoethyl)-1-phenyl-indane instead of 1-(3'-dimethylaminopropyl)-1-phenyl-indane a mixture of the isomeric hydrochlorides of 3-methyl-1-(2'-methylaminoethyl)-1-phenylindane was obtained. Repeated recrystallizations from acetone yielded the two isomeric hydrochlorides with the following characteristics:

α-form:    M.P.    172°–174° C.
(slightly soluble in acetone),

β-form: M.P. 126°–128° C.
(easily soluble in acetone).

Example 10 1-(3'-dimethylaminopropyl)-1-(m-trifluoromethylphenyl)-indane

When example 1 was carried out using 1-(m-trifluoromethylphenyl)-indane (B.P. 80°–85° C. 0.5 mm. Hg) instead of 1-phenyl-indane 1-(3'-dimethylaminopropyl)-1-(m-trifluoromethylphenyl)-indane was obtained as a yellow oil which boiled at 125°–130° C. at a pressure of 0.5 mm. Hg.

An elementary analysis gave the following result:

|  | C. | H | N |
|---|---|---|---|
| calculated | 72.6% | 6.92% | 4.03% |
| found | 72.4% | 7.21% | 4.02% |

Example 11 Other 3.3-dimethyl-1-(3'-dimethylaminopropyl)-substituted indanes and their hydrochlorides.

When example 1 was carried out using equivalent amounts of 3.3-dimethyl-1-(p-chlorophenyl)-indane, 3.3-dimethyl-1-(m-chlorophenyl)-indane, 3.3-dimethyl-1-(p-fluorophenyl)-indane, 3.3-di-methyl-1-(p-tolyl)-indane, 3.3-dimethyl-1-(m-tolyl)indane, 3.3-dimethyl-1-(p-methoxyphenyl)-indane, 3.3-dimethyl-1-(m-butoxyphenyl)-indane, 6-chloro-3.3-dimethyl-1-phenyl-indane, 6-trifluoromethyl-3.3-dimethyl-1-phenyl-indane, 6-isolpropyl-3.3-dimethyl-1-phenyl-indane, 5-fluoro-3.3-dimethyl-1-phenyl-indane respectively instead of 1-phenyl-indane the hydrochlorides of 3.3-dimethyl-1-(3'-dimethylamino-propyl)-1-(p-chlorophenyl)-indane 3.3-dimethyl-1-(3'-dimethylaminopropyl)-1-(m-chlorophenyl)-indane, 3.3-dimethyl-1-(3'-dimethylaminopropyl)-1-(m-chlorophenyl)-indane, 3.3-dimethyl-1-(3'-dimethylaminopropyl)-1-(p-fluorophenyl)-indane, 3.3-dimethyl-1-(3'-dimethylaminopropyl)-1-(p-tolyl)-indane, 3.3-dimethyl 1-(3'-dimethylaminopropyl-1-(m-tolyl)-indane, 3.3-dimethyl-1-(3'-dimethylaminopropyl)-1-(p-methoxyphenyl)-indane, 3.3-dimethyl-1-(3'-dimethylaminopropyl)-1-(m-butoxyphenyl)-indane, 6-chloro-3.3-dimethyl-1-(3'-dimethylaminopropyl)-1-phenyl-indane, 6-trifluoromethyl-3.3-dimethyl-1-(3'-dimethylaminopropyl)-1-phenyl-indane, 6-iso-propyl-3.3-dimethyl-1-(3'-dimethylaminopropyl)-1-phenyl-indane and 5-fluoro-3.3-dimethyl-1-(3'-dimethylaminopropyl)-1-phenyl-indane respectively were obtained.

Example 12 Other 3.3-dimethyl-1-(3'-methylaminopropyl)-substituted indanes and their hydrochlorides.

When example 2 was carried out using equivalent amounts of the hydrochlorides of 3.3-dimethyl-1-(3'-dimethylaminopropyl)-1-(p-chlorophenyl)-indane, 3.3-dimethyl-1-(3'-dimethylaminopropyl)-1-(m-chlorophenyl)-indane, 3.3-dimethyl-1-(3'-dimethylaminopropyl)-1-(p-fluorophenyl)-indane, 3.3-dimethyl-1-(3'-dimethylaminopropyl)-1-(p-toly)-indane, 3.3-dimethyl-1-(3'-dimethylaminopropyl)-1-(m-tolyl)-indane, 3.3-dimethyl-1-(3'-dimethylaminoproply)-1-(p-methoxyphenyl)-indane, 3.3-dimethyl-1-(3'-dimethylaminopropyl)-1-(m-butoxy-phenyl)-indane 6-chloro-3.3-dimethyl-1-(3'-dimethylaminopropyl)-1-phenyl-indane, 6-trifluoromethyl-3.3-dimethyl-1-(3'-dimethylaminopropyl)-1-phenyl-indane, 6-iso-propyl-3.3-dimethyl-1-(3'-dimethylaminopropyl)-1-phenyl-indane and 5-fluoro-3.3-dimethyl-1-(3'-dimethylaminopropyl)-1-phenyl-indane respectively instead of the hydrochloride of 1-(3'-dimethylaminopropyl)-1-phenyl-indane the hydrochlorides of 3.3-dimethyl-1(3'-methylaminopropyl)-1-(p-chlorophenyl)-indane, 3.3-dimethyl-1-(3'-methylaminopropyl)-1m-chlorophenyl-indane, 3.3-dimethyl-1-(3'-methylaminopropyl)-1-(p-fluorophenyl)-indane, 3.3-dimethyl-1(3' -methylaminopropyl)-1-(p-tolylphenyl)-indane, 3.3-dimethyl-1-(3'-methylaminopropyl)-1-(m-tolylphenyl)-indane, 3.3-dimethyl-1-(3'-methylaminopropyl)-1-(p-methoxyphenyl)-indane, 3.3-dimethyl-1-(3'-methylaminopropyl)-1-(m-butoxyphenyl)-indane, 6-chloro-3.3-dimethyl-1-(3'-methylaminopropyl)-1-phenyl-indane, 6-trifluoromethyl-3.3 dimethyl-1-(3'-methylaminopropyl)-1-phenyl-indane, 6-iso-propyl-3.3-dimethyl-1-(3'-methylaminopropyl)-1-phenyl-indane and 5-fluoro-3.3-dimethyl-1-(3'-methylaminopropyl)-1-phenylindane respectively were obtained.

Example 13 Other 3.3-dimethyl-1-phenyl-substituted indanes and their hydrochlorides.

When example 3 was carried out using equivalent amounts of 3-diethylaminopropylchloride, 3-di-n-butyl-aminopropylchloride, respectively, instead of 3-dimethylaminopropylchloride the hydrochlorides of 3.3-dimethyl-1-(3'-diethylaminopropyl)-1-phenylindane, 3.3-dimethyl-1-(3'-di-n-butylaminopropyl)-1-phenylindane, respectively, were obtained.

Example 14 3.3-dimethyl-1-(2'-dimethylaminoethyl)-1-phenyl-indane and its hydrochloride.

When example 3 was carried out using 10 grams of 2-dimethylaminopropylchloride instead of 3-dimethylaminopropylchloride the hydrochloride of 3.3-dimethyl-1-(2'-dimethylaminoethyl)-1-phenyl-indane was obtained as a crystalline substance melting at 161°–163° C.

The compounds of formula I and the pharmaceutically acceptable acid addition salts thereof may be administered to animals both orally and parenterally, and may be used for example in the form of tablets, capsules, powders, syrups or in the form of the usual sterile solutions for injection.

Most conveniently the compounds of formula I are administered orally in unit dosage form such as tablets or capsules, each dosage unit containing the compound or preferably a pharmaceutically acceptable acid addition salt of one of the said compounds in an amount of from about 0.1 to about 100 mg., most preferably, however, from about 0.5 to 25 mg., calculated as the free amine, the total daily dosage usually ranging from about 0.5 to about 300 mg. The exact individual dosages as well as daily dosages in a particular case will, of course, be determined according to established therapeutic principles.

When preparing tablets, the active ingredient is for the most part mixed with ordinary tablet adjuvants such as corn starch, potato starch, talcum, magnesium stearate, gelatine, lactose, gums, or the like. A suitable formula for a tablet containing 10 mg. of 3.3-dimethyl-1-(3'-methylaminopropyl)-1-phenyl-indane (called Lu 3–049 for short) in the form of its hydrochloride is as follows:

| Lu 3–049, hydrochloride | 11.2 mg. |
|---|---|
| potato starch | 36 mg. |
| lactose | 18 mg. |
| gelatine | 5 mg. |
| talcum | 6 mg. |
| magnesium stearate | 0.4 mg. |

Another suitable formulation for a tablet containing 10 milligrams of Lu 3–049 is as follows:

| Lu 3–049, hydrochloride | 11.2 mg. |
|---|---|
| potato starch | 40 mg. |
| polyvinylpyrrolidone | 5 mg. |
| sugar coated and colored | |

A suitable formulation for a capsule containing 10 milligrams of Lu 3–049 is as follows:

| Lu 3–049, hydrochloride | 11.2 mg. |
|---|---|
| corn starch | 90 mg. |
| lactose | 50 mg. |
| talcum | 2 mg. |
| filled in a gelatine capsule | |

A suitable formulation for an injectable solution containing one percent of Lu 3–049 in the form of its hydrochloride is as follows:

| Lu 3–049, hydrochloride | 11.2 mg. |
|---|---|
| sorbitol | 40 mg. |
| sterile water to make | 1 ml. |

Any other pharmaceutical tableting adjuvants may be used provided that they are compatible with the active ingredient, and additional compositions and dosage forms, may be similar to those presently used for thymoleptics such as imipramine, amitriptyline or nortriptyline. Also combination of the compounds of formula I as well as their nontoxic acid salts with other active ingredients especially other thymoleptics, neuroleptics, tranquillizers, or the like fall within the scope of the present invention.

As previously stated, when isolating the compounds of formula I in the form of an acid addition salt, the acid is preferably selected so as to contain an anion which is pharmacologically acceptable, at least in usual therapeutic doses. Representative salts which are included in this preferred group are the hydrochlorides, hydrobromides, sulfates, acetates, phosphates, nitrates, methanesulphonates, ethanesulphonates, lactates, citrates, tartrates, or bitartrates, and maleates of the amines of formula I. Other acids are likewise suitable and may be employed if desired. For example, fumaric, benzoic, ascorbic, succinic, salicyclic, bismethylenesalicyclic, propionic, gluconic, malic, malonic, mandelic, cinnamic, citraconic, stearic, palmitic, itaconic, glycolic, benzenesulfonic, and sulfamic acids may also be employed as acid addition salt forming acids. When it is desired to isolate a compound of the invention in the form of the free base, this may be done according to conventional procedure, as by dissolving the isolated or unisolated salt in water, treating with a suitable alkaline material extracting the liberated free base with a suitable organic solvent drying the extract and evaporating to dryness or fractionally distilling to effect isolation of the free basic amine.

It is to be understood that the invention is not limited to the exact details of operation or exact compound or compositions shown and described, as obvious modifications and equivalents will be apparent to one skilled in the art.

We claim:

1. A composition in unit dosage form comprising a pharmaceutical carrier and a pharmaceutically effective antidepressant dose of an active ingredient selected from the group consisting of a compound of the formula:

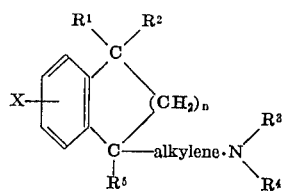

and a pharmaceutically acceptable acid addition salt thereof, wherein $R^1$ and $R^2$ each is selected from the group consisting of hydrogen and a lower-alkyl group, $n$ is selected from 1 and 2, "alkylene" is an alkylene chain containing from two to eight carbon atoms, at least two and at the highest four carbon atoms being in the chain directly connecting the ring system with the nitrogen atom,

is selected from the group consisting of mono-lower-alkylamino and di-lower-alkylamino, $R^5$ is selected from the group consisting of phenyl and phenyl substituted with a substituent selected from the group consisting of chlorine, fluorine, lower-alkyl, lower-alkyloxy and trifluoromethyl, and X is selected from the group consisting of hydrogen, chlorine, fluorine, lower-alkyl, lower-alkyloxy and trifluoromethyl.

2. A composition according to claim 1, wherein the active ingredient is present in an amount of from 0.1 to 100 milligrams per unit dose, calculated as the free amine.

3. A composition according to claim 1, wherein the active ingredient is present in an amount of from 0.5 to 25 milligrams per unit dose, calculates as the free amine.

4. A composition according to claim 1 wherein the active ingredient is a pharmaceutically acceptable acid addition salt of a compound of the formula:

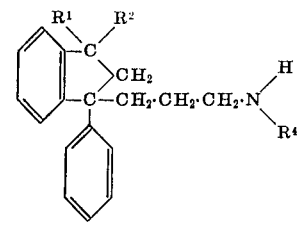

wherein $R^1$ and $R^2$ each is a lower-alkyl group and $R^4$ is a lower-alkyl group.

5. A composition according to claim 1 wherein the active ingredient is an acid addition salt of 3.3-dimethyl-1-(3'-methylaminopropyl)-1-phenyl-indane.

6. A composition according to claim 1 wherein the active ingredient is the hydrochloride of 3.3-dimethyl-1-(3'-methylamino-propyl)-1-phenyl-indane.

7. A composition according to claim 1 wherein the active ingredient is the acid addition salt of 3.3-dimethyl-1-(3'-dimethylaminopropyl)-1-phenyl-indane.

8. A composition according to claim 1 wherein the active ingredient is the hydrochloride of 3.3-dimethyl-1-(3'-dimethylaminopropyl)-1-phenyl-indane.

9. The method of treating endogenous depression which comprises administering to a mammal a therapeutically effective dose of an antidepressant compound selected from the group consisting of a compound of the formula:
0006

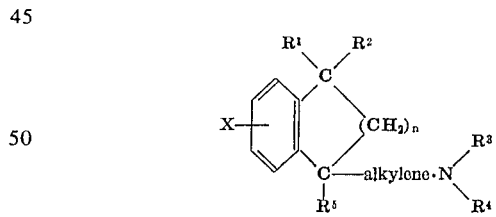

and a pharmaceutically acceptable acid addition salt thereof, wherein $R^1$ and $R^2$ each is selected from the group consisting of hydrogen and a lower-alkyl group, $n$ is selected from 1 and 2, "alkylene" is an alkylene chain containing from two to eight carbon atoms at least two and at the highest four carbon atoms being in the chain directly connecting the ring system with the nitrogen atom,

is selected from the group consisting of mono-lower-alkylamino and di-lower-alkylamino, $R^5$ is selected from the group consisting of phenyl and phenyl substituted with a substituent selected from the group consisting of chlorine, fluorine, lower-alkyl, lower-alkyloxy and trifluoromethyl, and X is selected from the group consisting of hydrogen, chlorine, fluorine, lower-alkyl, lower-alkyloxy and trifluoromethyl.

10. A method of treating endogenous depression according to claim 9 which comprises administering an effective quantity of between about 0.1 and about 100 milligrams of the antidepressant compound.

11. A method of treating endogenous depression according to claim 9 which comprises administering an effective quantity of between about 0.5 and about 25 milligrams of the antidepressant compound.

12. The method of claim 9, wherein the antidepressant compound is a pharmaceutically acceptable acid addition salt of a compound of the formula:

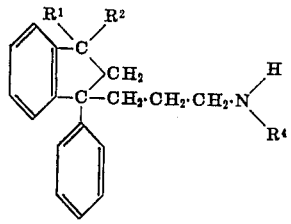

wherein $R^1$, $R^2$ and $R^4$ each is a lower-alkyl group.

13. The method of claim 9 wherein the antidepressant compound is a pharmaceutically acceptable acid addition salt of 3.3-dimethyl-1-(3'-methylaminopropyl)-1-phenyl-indane.

14. The method of claim 9, wherein the antidepressant compound is the hydrochloride of 3.3-dimethyl-1-(3'-methylaminopropyl)-1-phenyl-indane.

15. The method of claim 9, wherein the antidepressant compound is a pharmaceutically acceptable acid addition salt of 3.3-dimethyl-1-(3'-dimethylaminopropyl)-1-phenyl-indane.

16. The method of claim 9, wherein the antidepressant compound is the hydrochloride of 3.3-dimethyl-1-(3'-dimethylaminopropyl)-1-phenyl-indane.

* * * * *

UNITED STATES PATENT OFFICE
CERTIFICATE OF CORRECTION

Patent No. 3,621,101  Dated 16 November 1971

Inventor(s) Povl V. Petersen et al.

It is certified that error appears in the above-identified patent and that said Letters Patent are hereby corrected as shown below:

[32] Priority
"Oct. 10, 1965"
-- Oct. 1, 1965 --

[73] Assignee
"Kefalas AIS"
-- Kefalas A/S --

Col. 1, line 20
Page 1, line 20
General Formula

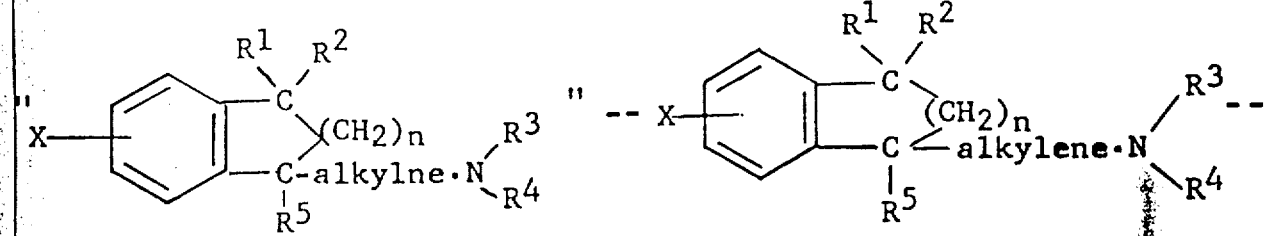

Col. 1, line 27
Page 1, line 23
"represents alkylene"
-- represents an alkylene --

Col. 1, line 55
Page 2, line 15
"or"
-- on --

Col. 4, line 27
Page 7, line 26
"proply"
-- propyl --

Col. 4, line 45
Page 8, line 10
"3+-dimethylaminoproply)..."
-- 3'-dimethylaminopropyl)... --

Col. 4, line 50
Page 8, line 14
"(1:1"
-- (1:1) --

-1-

UNITED STATES PATENT OFFICE
CERTIFICATE OF CORRECTION

Patent No. 3,621,101                     Dated  16 November 1971

Inventor(s)   Povl V. Petersen et al.

It is certified that error appears in the above-identified patent and that said Letters Patent are hereby corrected as shown below:

| | |
|---|---|
| Col. 5, line 5<br>Page 9, line 11 | "...C. 0.5"<br>-- ...C./0.5 -- |
| Col. 5, line 23<br>Page 9, line 24 | "tolyl)indane"<br>-- tolyl)-indane -- |
| Col. 5, line 26<br>Page 9, line 27 | "6-isolpropyl-..."<br>-- 6-isopropyl -- |
| Col. 5, line 29<br>Page 9, line 30 | "...-indane 3.3-"<br>-- ...-indane, 3.3- --- |
| Col. 5, lines 31 and 32<br>Page 9, line 32 | delete the following (a repetition):<br>"3.3-dimethyl-1-(3'-dimethylamino-<br>propyl)-1-(m-chlorophenyl)-indane" |
| Col. 5, line 35, beginning of line<br>Page 10, line 1 | "dimethyll-..."<br>-- dimethyl-1-... -- |
| Col. 5, line 53<br>Page 10, line 16 | "...(p-toly)..."<br>-- ...(p-tolyl)... -- |
| Col. 5, line 58, beginning of line<br>Page 10, line 19 | "indane"<br>-- indane, -- |
| Col. 5, line 66 (end of line)<br>Page 10, line 26 | "-1m"<br>-- -1-m -- |
| Col. 5, line 69, beginning of line<br>Page 10, line 28 (end of line) | "-dimethyl-1(3'..."<br>-- -dimethyl-1-(3'... -- |

-2-

UNITED STATES PATENT OFFICE
CERTIFICATE OF CORRECTION

Patent No. 3,621,101                Dated  16 November 1971

Inventor(s)  Povl V. Petersen et al.

It is certified that error appears in the above-identified patent and that said Letters Patent are hereby corrected as shown below:

Col. 5, line 75              "...-3.3 dimethyl-..."
Page 10, line 34             --...-3.3 - dimethyl-... --

Col. 7, lines 21-22          "salicyclic, bismethylenesalicyclic"
Page 13, lines 15-16         --salicylic, bismethylenesalicylic --

Col. 7, line 29              "material"
Page 13, line 23             -- material, --

CLAIM 3, Col. 8, line 6;     "calculates"
Page 15, line 1 (Claim 3,    -- calculated --
 line 3)

Col. 8    - Col. 9           Page 15 - CLAIM 4
CLAIM 4    CLAIM 12          Page 17 - CLAIM 12
     In the above claims, 4 and 12, the formula should
     be corrected:

"

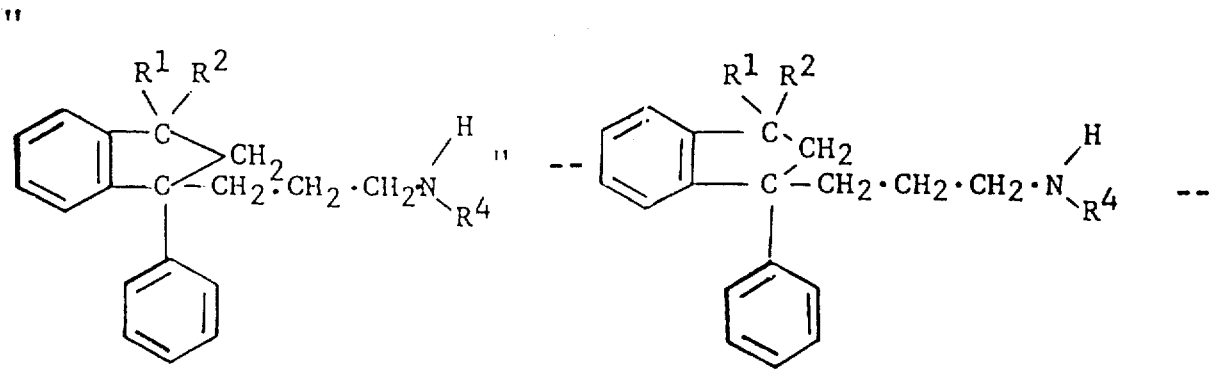

"

Col. 8, line 44, CLAIM 9, above the formula:
"0006" should be deleted - as a printing error - does not appear in application.

UNITED STATES PATENT OFFICE
CERTIFICATE OF CORRECTION

Patent No. 3,621,101           Dated 16 November 1971

Inventor(s)    Povl V. Petersen et al.

It is certified that error appears in the above-identified patent and that said Letters Patent are hereby corrected as shown below:

CLAIM 14, Col. 10, line 6 (end of line) - printing is unclear      "... -1 (3'-"

Claim 14, page 17, line 2 of claim.      -- ...-1-(3'- --

Signed and sealed this 30th day of May 1972.

(SEAL)
Attest:

EDWARD M. FLETCHER, JR.         ROBERT GOTTSCHALK
Attesting Officer                Commissioner of Patents